United States Patent [19]

Bussard

[11] Patent Number: 4,838,965
[45] Date of Patent: Jun. 13, 1989

[54] HOLOGRAPHIC ART APPLIED TO T-SHIRTS OR OTHER TEXTILE PRODUCTS

[76] Inventor: Janice W. Bussard, 201 N. Fruitport Rd., Spring Lake, Mich. 49456

[21] Appl. No.: 147,492

[22] Filed: Jan. 25, 1988

[51] Int. Cl.$^4$ .............................................. B32B 31/02
[52] U.S. Cl. ........................................ 156/83; 2/115; 2/243 R; 40/360; 156/277; 156/298; 156/303.1; 350/3.6; 430/1; 430/2
[58] Field of Search ............... 156/83, 303.1, 277, 156/298; 2/115, 243 R; 350/3.6; 430/1, 2; 40/360

[56] References Cited

U.S. PATENT DOCUMENTS 4,466,136  8/1984  Bottom et al. ........................ 2/115

FOREIGN PATENT DOCUMENTS 2038892  2/1972  Fed. Rep. of Germany ...... 156/277

Primary Examiner—John J. Gallagher

[57] ABSTRACT

A hologram being adhered to a textile fabric by means of a silk screen printing ink while at the same time printing a graphic on the textile; the ink embedding the hologram edges therein and the ink containing an ingredient to bond with the hologram.

4 Claims, 1 Drawing Sheet

U.S. Patent          Jun. 13, 1989          4,838,965
*Fig. 1*
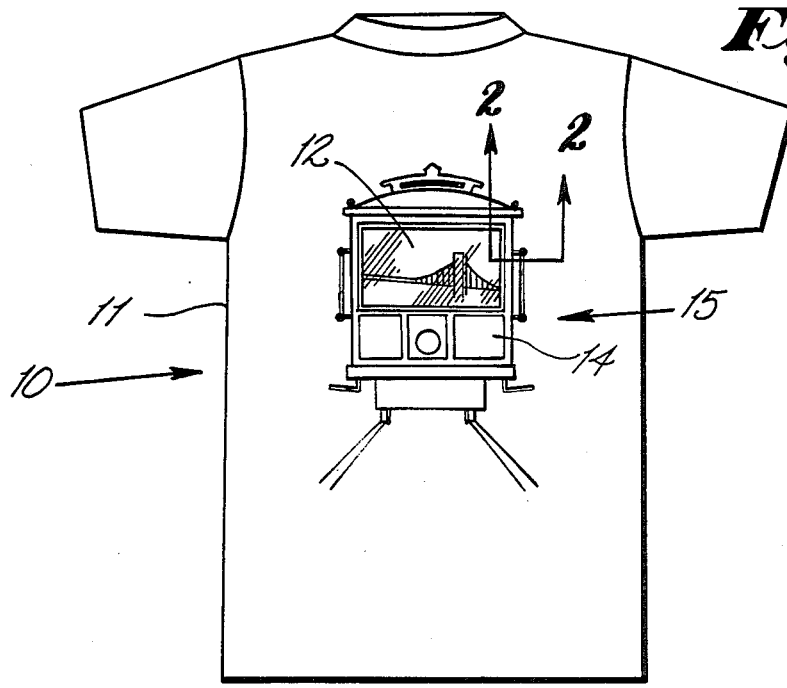
*Fig. 2*
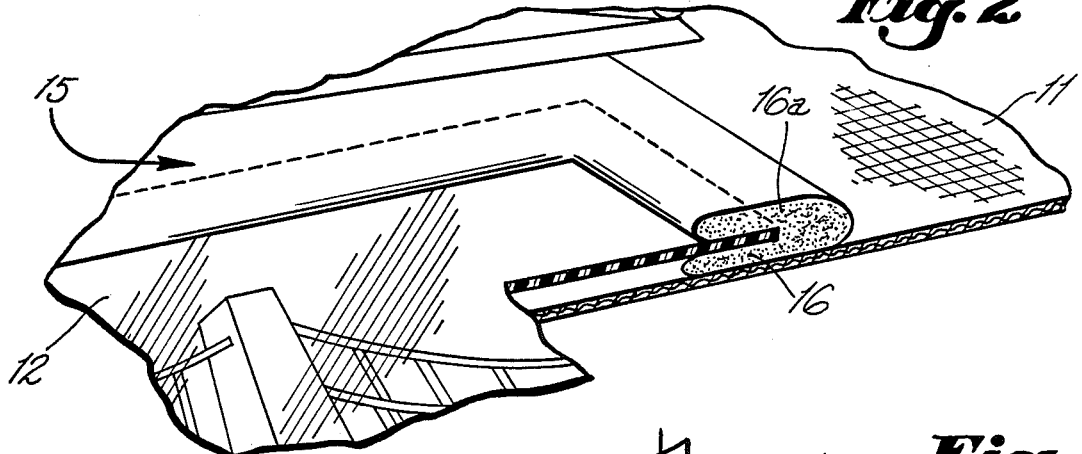
*Fig. 3*
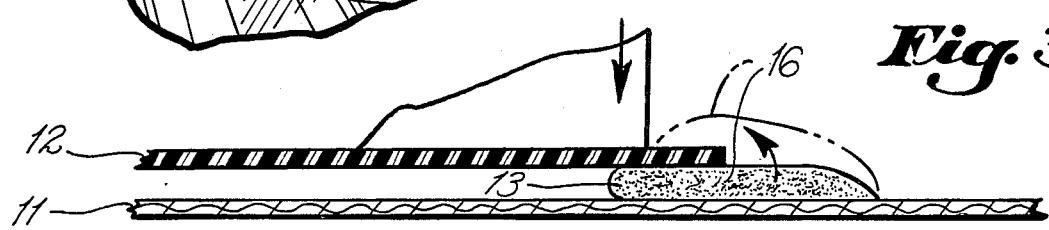
*Fig. 4*
HOLOGRAPH 12
INK 16
SUBSTRATE FABRIC 11
*Fig. 6*
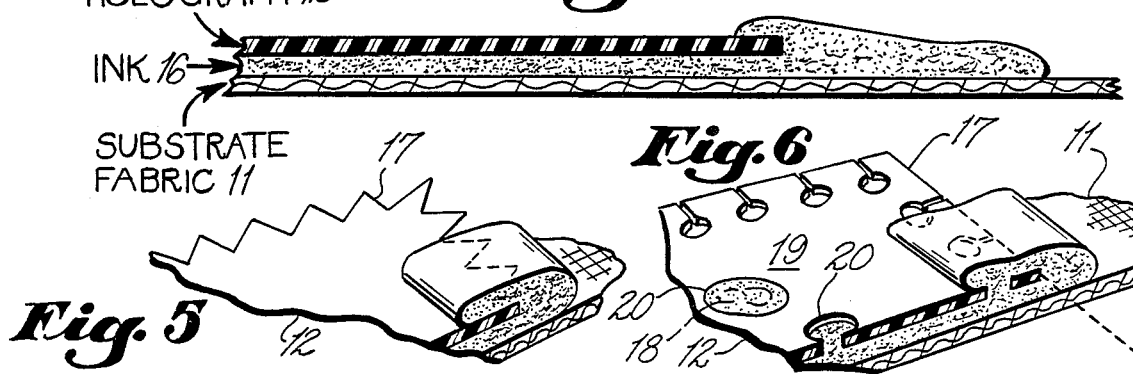
*Fig. 5*
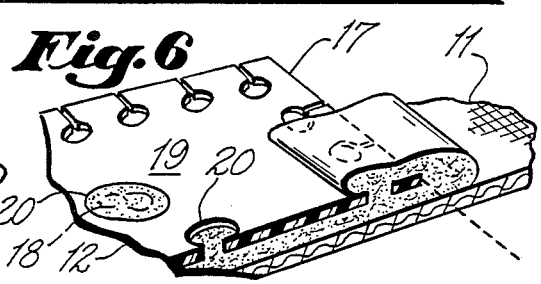

HOLOGRAPHIC ART APPLIED TO T-SHIRTS OR OTHER TEXTILE PRODUCTS

BACKGROUND OF THE INVENTION

1. Field of the Invention:

This invention relates generally to T-shirts or other textile products such as are often manufactured to include various decorative art applied thereupon. More specifically this invention incorporates holographic art which is a form of picture making that uses no camera, yet is capable of producing a three-dimentional image to be developed and printed on metalized polyester film through harnessing light from a laser. Holographic art emits the brilliant color spectrum, depending upon light intensity and movement, and when interfacing it with silk screen printing or other art, a graphic is enhanced, an effective focal point established, and a human involvement device, which draws people to the product, is created.

2. Prior Art:

The art of holography, a relatively new concept, is currently at the forefront of innovative ideas in advertising, packaging, publishing, direct marketing, and anticounterfeiting applications. Holograms or holographs are a logical theft and fraud detergent because they cannot be removed or reproduced without being destroyed. The tiny dove that appears on Visa charge cards and the globes on MasterCard credit cards, lasered from sculpted models, which were destroyed immediately upon completion of their use of holographic imaging purposes, illustrate this concept.

In pictoral graphics holographic imagery has been used alone, such as on postal and greeting cards, labels and their application to stationery and Tonka toys, display advertising, packaging for IBM software and cereal, and as die-cut letters or other small pieces designed to become portions of a larger entire graphic, such as a bumper on an old car, a kite on a string, a sail on a boat, the eyes for a black cat, sunglasses on a weirdo, and endless other applications.

To date, holograms have been applied to a product by either the hot stamping or pressure sensitive method on paper and cardboard, plastic, and metal products. However, thus far, the necessary ingredients to permanently bond metalized polyester film (upon which holograms are developed) to textiles with reasonable resistance to ordinary wear, tear, and use, such as washing and drying, are not known.

T-shirts, on the other hand, have been an old favorite from long ago. One reason for their perennial popularity, in addition to their comfort in wear, is the fascination of the variety of designs, slogans, names and the like that are imprinted thereupon for being displayed by a wearer. Accordingly, T-shirt manufacturers continue to offer new designs for the ever receptive market. Heretofore most such designs have been placed on the T-shirt either by a silk screen printing process or by hot stamping of prints thereupon. These methods have limited T-shirt decorating to monotonously static graphic art that has continued without change for many years, so it is believed that by now the vastly grown T-shirt market is ready for some additional innovation.

SUMMARY OF THE INVENTION

Accordingly, it is a principal object of the present invention to provide holographic art applied to textile products, and particularly to T-shirts, sweatshirts, and other garment wear or textile product for the purpose of presenting a new fashion in decoration thereto.

Another object is to provide holographic art, which is ideal for T-shirts and other garments or products because its viewing and observing appreciation requires a degree of light intensity and angular body movement, for product enhancement and its aesthetic enjoyment thereof. The apparent magic of embossed diffraction, which reflects images while exhibiting the color spectrum, is the intrinsic value or human involvement device that draws humans to holographic art.

Yet another object is to provide a holographic art applied to T-shirts and other textile products which may be either the sole ornamentation or that which comprises only a portion for a total graphic by interfacing it with a portion of conventional art printed in ink or by some other application on textiles.

These and other objects will be readily evident upon a study of the following specification and the accompanying drawing.

BRIEF DESCRIPTION OF THE DRAWING FIGURES

FIG. 1 is a front elevational view of a T-shirt shown incorporating the present invention.

FIG. 2 is a greatly enlarged cross-sectional view taken on line 2—2 of FIG. 1, and shown in perspective for reason of greater clarity.

FIG. 3 is a similar cross-sectional view thereof and illustrating a possible step in the production thereof.

FIG. 4 is a similar cross-sectional view showing a modified construction thereof.

FIG. 5 is a greatly enlarged fragmentary perspective view of a modified edge made on the hologram.

FIG. 6 is a similar view of another modified design thereof.

DETAILED DESCRIPTION OF PREFERRED EMBODIMENTS

Referring now to the drawing in greater detail, and more particularly to FIGS. 1 and 2 thereof at this time, the reference numeral 10 represents an assembly of a T-shirt 11 and a hologram or holograph 12 that are permanently bonded together by an ink compound 13 used primarily for printing a graphic design 14 or the like upon the surface of the T-shirt by the conventional screen printing process; the hologram 12 and the graphic portion 14 together forming a total graphic 15 that is visible to a viewer. In the present invention, the ink compound also forms a portion 16 upon which the hologram is placed, and to which it becomes bonded.

The ink comprises any ink conventionally used for printing upon textiles but which also includes an additional adhesive ingredient, which may be finely ground cellular polystyrene (trademarked as Styrofoam). After the printing operation, the T-shirt goes through the dryer for curing purposes. The application of heat and air causes the ink to puff up as the cellular polystyrene particles expand. Conventionally available Plastipuff ink manufactured by Union Ink Company, Inc., Ridgefield, N.J., appears to produce similarly favorable characteristics.

As shown in FIG. 2, the ink portion 16 may be made to extend only under the edge areas of the hologram or the edge may be embedded within the ink by means of either another layer of ink 16a being applied thereupon, or else by means of the originally applied ink 16 being squeezed upwardly and around the hologram edge when the hologram is pressed down (as illustrated in FIG. 3). The bonding process occurs when heat and pressure are applied thereupon.

As shown in FIG. 4, the ink portion 16 may alternately extend under the entire area of the hologram for being bonded throughout.

The hologram is developed upon metalized polyester film, and should be backed with hot stamped adhesive or the like for rigidity purposes, which softens or somewhat melts sufficiently during a heat and pressure application so to bond and become integral with the softened or somewhat melted cellular polystyrene particles in the ink. In the example illustrated in FIG. 1, the graphic design 14 represents a San Francisco cable car and the hologram illustrates the window reflected Golden Gate Bridge in the distance.

The edges 17 of the hologram may be made alternately sawtoothed, slotted, perforated or otherwise configurated for further improved anchoring in the ink, if preferred (as shown in FIGS. 5 and 6).

As also shown in FIG. 6 openings 18 may be provided through a central area 19 of the hologram, and through which the ink 16 from below is forced upwardly to form enlarged rivetlike heads 20 on top for further anchoring the hologram; the heads becoming portions of the graphic design 14.

For a different visual effect, a diffraction grating might be substituted for the hologram, both of which are made by laser process. Also instead mounting the total graphic only on textiles, it could be applied to any object made either of wood, metal, plastic, glass, leather or other material.

I claim:

1. A process of applying a holographic art element to a T-shirt or other textile product, comprising, in sequence, first developing a hologram upon a metalized polyester film and backing said film with a hot-stamped adhesive to form said holographic art element, then, using a printing ink compound containing finely ground cellular polystyrene printing a graphic upon a surface of said T-shirt or textile, placing said T-shirt or textile in a dryer for curing said printing ink compound and wherein applying heat and air causes said finely ground cellular polystyrene in said ink compound to puff up, placing said holographic art element upon a portion of said printed ink compound, leaving a remaining portion of said printed ink compound uncovered to view, applying heat to soften and somewhat melt both said printed ink compound and said hot-stamped adhesive, while applying pressure for bonding said compound and said adhesive together and squeezing said printed ink compound up around edges of said holographic art element, embedding said edges therein.

2. A textile assembly, comprising in combination, a fabric product, a holographic art element, and an ink compound for securely mounting said holographic art element upon said fabric product; said fabric product comprising a T-shirt, said holographic art element comprising a hologram developed upon metalized polyester film backed with hot-stamped adhesive for rigidity and having the characteristic of becoming softened and somewhat melted when heated, and said ink compound being printed upon a surface area of said T-shirt, a portion of said printed surface being between said T-shirt and a rear side of said holographic art element for securement therebetween, and another portion of said printed surface being left uncovered and forming a graphic design, said hologram and said graphic design together forming a completed total design for being viewed, and said ink compound comprising an adhesive printing ink mixed with an additional ingredient of finely ground cellular polystyrene having the characteristic of expanding and puffing up after application of heat thereto.

3. The combination as set forth in claim 2, wherein edges of said holographic art element are embedded within said ink compound.

4. The combination as set forth in claim 3 wherein said edges are slotted and perforated for anchoring in said ink compound.

* * * * *